United States Patent [19]

Rajamannan

[11] Patent Number: 5,287,818
[45] Date of Patent: Feb. 22, 1994

[54] METHOD FOR KILLING SOIL PATHOGENS WITH MICRO-WAVE ENERGY

[75] Inventor: A. H. J. Rajamannan, Minneapolis, Minn.

[73] Assignee: Aqua Heat Technology Inc., Fridley, Minn.

[21] Appl. No.: 59,463

[22] Filed: May 11, 1993

[51] Int. Cl.⁵ .......................................... H01C 23/00
[52] U.S. Cl. ..................... 111/200; 47/1.42; 111/118; 405/128; 405/258; 405/131; 172/1; 172/721
[58] Field of Search ............ 405/128, 129, 258, 131, 405/303; 111/200, 128, 127, 118; 47/1 F, 1.42, 1.43, 1.3; 172/1, 721, 776

[56] References Cited

U.S. PATENT DOCUMENTS

| | | |
|---|---|---|
| 1,337,562 | 4/1920 | Nicholson et al. ........... 47/1.42 X |
| 1,991,851 | 2/1935 | Hammell ........................ 47/1 F |
| 2,565,439 | 8/1951 | Sears et al. .................... 111/200 X |
| 3,307,289 | 3/1967 | Lemm ............................ 111/200 X |
| 3,581,686 | 6/1971 | Raymond ...................... 111/200 |
| 3,837,304 | 9/1974 | Carroll ........................... 111/118 |
| 4,872,412 | 10/1989 | Zollinger ..................... 111/200 X |
| 4,873,789 | 10/1989 | Plattner ........................ 47/1.42 |
| 5,141,059 | 8/1992 | Marsh ........................... 172/1 |

Primary Examiner—Dennis L. Taylor
Attorney, Agent, or Firm—Herman H. Bains

[57] ABSTRACT

A method of killing soil pathogens to improve the agricultural production of a field comprises the steps of moving a plurality of agricultural tools through the soil and during this movement emitting microwave energy into the soil at a frequency within the range of 2GH$_z$ to 12GH$_z$. The microwave energy heats the soil organisms to levels sufficient to kill the organisms.

6 Claims, 1 Drawing Sheet

METHOD FOR KILLING SOIL PATHOGENS WITH MICRO-WAVE ENERGY

FIELD OF THE INVENTION

This invention relates to a method of killing soil pathogens and more particularly to a method of killing soil pathogens with microwave energy.

BACKGROUND OF THE INVENTION

In my co-pending application, Ser. No. 08/014,853, entitled "Soil Pathogen Killing Process", filed Feb. 8, 1993, agricultural soil working tools are moved through a field as hot water is discharged from the tools to kill a soil borne pathogens and to thereby improve agricultural production of the field. The high temperature of the water is lethal to the soil organisms including pathogens, and this hot water process is effective in killing soil borne pathogens. Although this hot water method is highly efficient in killing soil pathogens, it (method) requires a reservoir of hot water to be transported by or with the agricultural implement to which the tools are attached. Hot water equipment requires a large volumetric space.

SUMMARY OF THE INVENTION

It is an object of this invention to provide a method of killing soil pathogens with microwave energy emitted by microwave generator units mounted on agricultural subsurface soil working tools. In this method, the soil is pretreated by plowing to loosen the soil, and soil conditioners are then added to hasten the breakdown the soil clods. Each of a plurality of subsurface tools comprising components of an agricultural implement are provided with a plurality of microwave energy generator units which emit microwave energy. As the tools of the implement are moved through the soil, the emitted microwave energy will selectively raise the temperature of organic material within the soil including soil pathogens to thereby destroy the pathogens.

DESCRIPTION OF THE PREFERRED EMBODIMENT OF THE INVENTION

Figure 1:
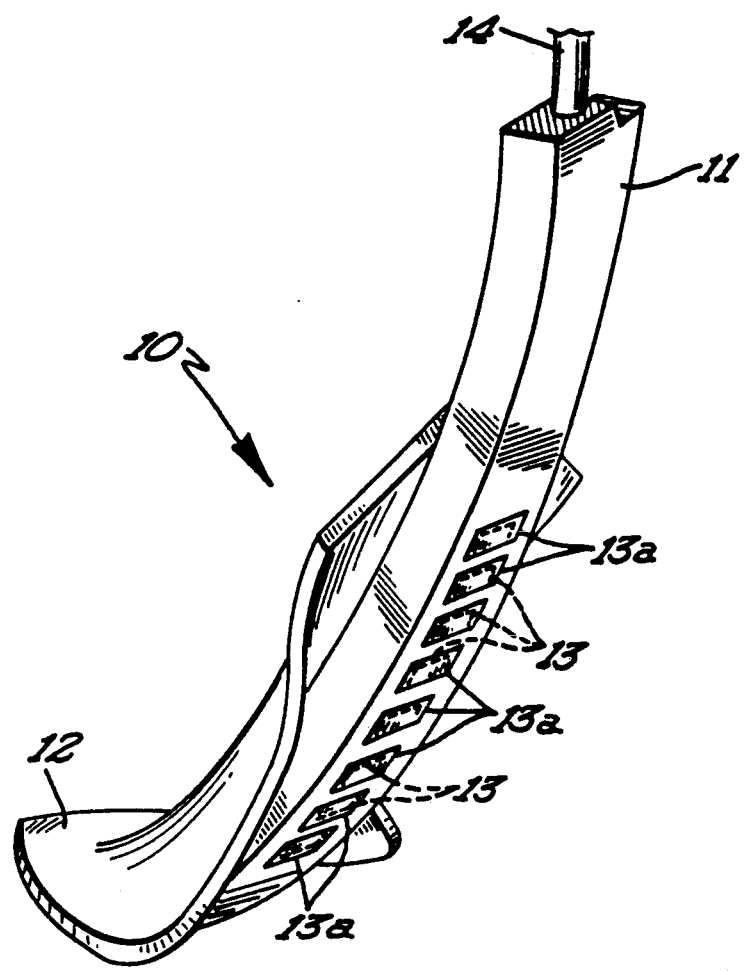
FIG. 1 is a diagrammatic view of an agricultural subsurface tool having a plurality of microwave generator units mounted thereon which emit microwave energy.

The present method uses microwave energy which is emitted into the soil during movement of a plurality of agricultural subsurface tools through the soil. The microwave energy is absorbed by organic material within the soil including pathogenic organisms which causes death of these organisms.

In carrying out the present method, the soil is first pretreated by plowing to loosen soil compaction. Soil conditioners are then added to hasten break down of clods. Chemical or biological soil conditioners are effective in reducing clods to microaggregates. A biological soil conditioner which works extremely well is the commercial soil conditioner sold under the trademark SUPER SYMBEX by Agro-K Corporation Inc. of Minneapolis, Minn. A chemical soil conditioner which is highly effective in reducing clods to microaggregates is ammonium laureth sulfate also sold by Agro-K Corporation Inc.

Microwave generator units are mounted on each of a plurality of subsurface tools that are components of a conventional agricultural implement. As the tools are moved through the soil, microwave energy is emitted and the energy elevates the temperature within the pathogenic organs to lethal levels.

Referring now to the drawings, it will be seen that a conventional subsurface agricultural tool 10 is there-shown and includes a plurality of microwave generator units thereon. The tool 10 is one of a plurality of such tools mounted on a conventional sod busting agricultural implement such as that shown in my co-pending application Ser. No. 08/014,853 filed Feb. 8, 1993 entitled "Soil Pathogen Killing Process". The disclosure in my co-pending application is incorporated by a reference herein to the extent of the general type of agricultural implement described in my co-pending application. Each tool 10 includes an elongate flexible shank 11 having a shovel 12 mounted thereon. The shank 11 also has a plurality of microwave generator units 13 mounted thereon each provided with a dome 13a to afford protection to the microwave generator units. It will be noted that the microwave generator units 13 are arranged in vertically spaced apart relation on the shank to permit emission of the microwave energy into the soil at various depths.

The shank 11 is provided with an opening therein to accommodate the cable 14 which is connected to suitable power units (not shown) for supplying electrical energy to the microwave generator units 13. These microwave generator units are of industrial strength and are available commercially. It is pointed out that each microwave generator unit 13 includes an oscillator and wave guide of conventional commercial construction.

The microwave generator 13 will broadcast microwaves into the soil medium. These microwaves will oscillate the water molecules within the living organisms that are in the soil. The oscillations of these molecules will cause a rise in the temperature of the organisms preferentially prior to heating up the inorganic grains of soil. This rise in temperature to lethal levels causes the death of these organisms. The selective raising of the temperature of the organic material including organisms within the soil utilizes less energy to kill the organism than the methods used to heat the entire soil mass.

Various experiments conducted in different soil types gave the results that are embodied in Table I. In this regard, a farm tractor with sufficient power to pull the agricultural implements containing the plurality of the tools illustrated in FIG. 1 was used to pull the tools at a depth from approximately 3" to 36".

TABLE I

| Depths of soil treated Below the surface Tractor Moving at ¼ miles per hour | Percent Kill of all Organisms | | |
|---|---|---|---|
| | Sandy Soil | Loaming Soil | Clay Soil |
| 3" | 100% | 100% | 100% |
| 6" | 100% | 100% | 90% |
| 12" | 100% | 90% | 88% |
| 16" | 90% | 87% | 85% |
| 18" | 87% | 85% | 83% |
| 24" | 85% | 83% | 80% |
| 30" | 85% | 81% | 78% |
| 36" | 85% | 80% | 75% |

The results showed that the deeper the soil from the surface, the dynamics of the soil moisture content changed, the porosity of the soil in sandy soil showed better penetration of the microwaves to kill the target organism.

The power requirements in the microwave generator units will be variable depending on the volume of moisture (water) in target organisms that are present in the soil to be tested and the speeds at which the tractor travels.

What is claimed is:

1. A method for killing soil pathogens in a field to improve agricultural production comprising moving a plurality of agricultural subsurface soil working tools through a field and during the movement of the tools simultaneously emitting microwave energy at a predetermined frequency range into the soil at levels located below the surface thereof from a plurality of microwave generators mounted on each tool to thereby instantaneously heat the soil organism to lethal levels sufficient to kill the soil organisms.

2. The method as defined in claim 1 wherein the microwave energy emitted into the soil from each microwave generator has a frequency within the range of $2GH_z$ to $12GH_z$.

3. The method as defined in claim 2 wherein said microwave energy is emitted into the soil at depth from the surface within range of 3" to 36".

4. The method as defined in claim 1 wherein the field is first plowed and then treated with soil conditioners to reduce the soil microaggregates prior to movement of the tools through the soil and emission of the microwave energy into the soil.

5. The method as defined in claim 4 wherein said soil conditioners are selected from the group consisting of a biological soil conditioner or a chemical soil conditioner.

6. The method as defined in claim 3 wherein each tool includes an elongate shank, the microwave generators for each tool being vertically spaced apart on the shank to permit emission of microwave energy from the generators of each tool at varying depths below the surface of the soil.

* * * * *